Nov. 16, 1948.　　　　L. REICHOLD　　　　2,454,205
FILTERING DEVICE
Filed Oct. 9, 1944

Inventor
LUDWIG REICHOLD.
Louis V. Lucia
Attorney

Patented Nov. 16, 1948

2,454,205

UNITED STATES PATENT OFFICE 2,454,205

FILTERING DEVICE

Ludwig Reichold, Winsted, Conn., assignor to The Silex Company, Hartford, Conn., a corporation of Connecticut Application October 9, 1944, Serial No. 557,903

4 Claims. (Cl. 210—162)

This invention relates to a filtering device for coffee makers and more particularly for coffee makers of the vacuum type wherein the filter is mounted in an upper bowl having a stem depending therefrom.

The object of this invention is to provide a filter which can be easily placed in operable position within the upper bowl, which is sanitary and which can be readily manipulated from the top of the bowl for securing the filter in position.

Further objects and advantages of this invention will be more clearly understood from the following description and from the accompanying drawings in which.

Figure 1:
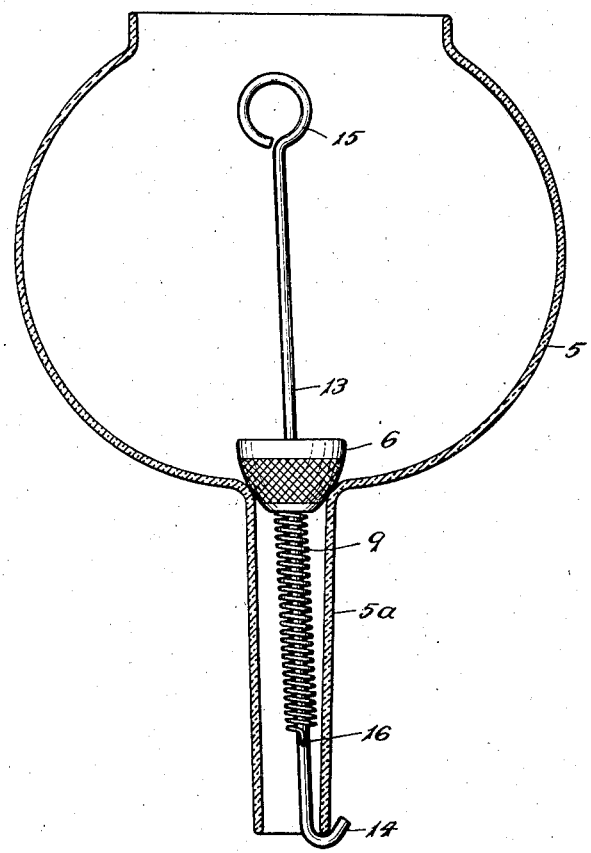
Fig. 1 is a side view of my novel filtering device showing the same in position within the upper bowl of a coffee maker.
Figure 2:
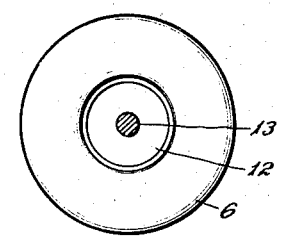
Fig. 2 is a plan view of the same on an enlarged scale.

As shown in the drawings, the numeral 5 denotes the upper bowl of a coffee maker which is usually constructed of glass but may also be of metal or any other suitable material.

My improved filter comprises a filtering portion 6, preferably of glass, having a tapered exterior surface and an opening 7 extending therethrough with an enlarged portion 8 in said opening.

A spring 9 extends into said opening and has an enlarged portion 10 engaging a shoulder 11 in said opening for securing said spring to the filtering portion 6.

A retaining washer 12 is forced into the portion 8 of the opening and a rod 13 extends through said washer and is slidable in a central opening therein which closely fits the rod but permits slight tilting movement thereof. The said rod is provided at its lower end with a hook 14 for engaging the bottom of the stem and at its upper end it may be provided with a handle portion 15.

The spring 9 is secured to the rod 13 at its lower end as illustrated at 16.

In the operation of my improved filtering device, the same may be inserted in the bowl by simply grasping the handle portion 15 and pushing the rod downwardly into the stem 5—a until the hook 14 has reached the lower end of the stem, a slight tilting movement of the rod will then engage the hook 14 with the bottom of the stem and thus retain the filter portion 6 seated in the mouth of the stem by the tension in the spring 9 which has been stretched during the downward movement of the rod 13.

It will be noted that the washer 12, being relatively thin, will allow tilting movement of the rod 13 so that the hook 14 may move towards one side of the stem to engage the bottom thereof while at the same time the opening in the washer may fit relatively close to the exterior of the rod to thereby prevent the passage of coffee grounds or other materials through said opening.

Figure 3:
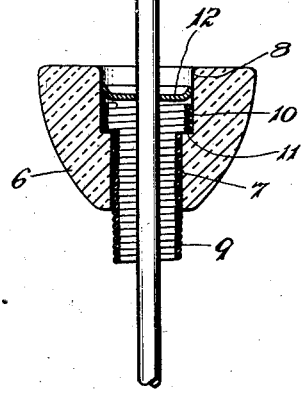
Fig. 3 is a side view, in central vertical section, of a portion of the device.

The construction above described provides an important advantage in that it permits a maximum length of the spring 9 to be used by anchoring the spring above the bottom of the filtering portion 6 as clearly illustrated in Fig. 3. A part of the operating portion of the spring is thus contained directly in the filter portion and allows a maximum operating length to the spring which permits the adaptation of the filter to bowls having different length of stems.

Figure 4:
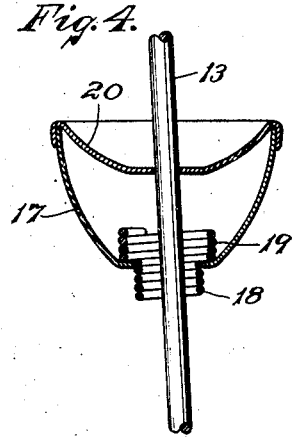
Fig. 4 is a similar view showing a modified form of the invention.

In the modified form illustrated in Fig. 4, the filter portion 17 may be cup-shape, of metal or other suitable material and provided with an opening in the bottom thereof through which the spring 18 extends. The said spring has a head 19 which seats upon the marginal portion of said opening. A separate disk 20, preferably cup-shaped, is secured to the top of the cupped portion 17 and has an opening in the center thereof for receiving the rod 13; the opening in said portion 20 acting the same as the opening in the washer 12 and fits closely to the rod 13 while permitting sliding and tilting movement thereof.

I claim:

1. A filter of the character described comprising a filtering portion having an opening extending therethrough, a shoulder extending into said opening, a coiled spring member extending from said shoulder downwardly through said opening and having at its upper end an enlarged portion seated on said shoulder, a rod extending downwardly through said filtering portion and spring member and connected at its lower portion to the lower end of said spring, a hook at the lower end of said rod, and means for preventing the passage of particles, through said opening.

2. A filtering device of the character described comprising a filtering portion having an opening extending therethrough a shoulder extending into said opening, a helical spring having an enlarged upper end portion seated on said shoulder extending downwardly therefrom through said opening, a washer fitting within said opening above said spring and having a central aperture, a rod extending through said aperture and downwardly within said spring and slidably and tiltably movable in said aperture, and a hook at the bottom of said rod; the said spring being secured at its lower end to the lower portion of said rod at a point above said hook, and the said rod fitting in said aperture sufficiently close to prevent the passage of particles, therethrough.

3. A filtering device of the character described comprising a filtering portion having an opening extending therethrough a shoulder extending into said opening, a helical spring having an enlarged end portion seated on said shoulder depending downwardly from said portion, a washer fitting within said opening above the spring for retaining said spring therein, a rod extending downwardly through a central aperture in said washer and slidably and tiltably movable therein, the said rod fitting sufficiently close in said aperture to prevent the passage of particles, therethrough; the said spring being secured at its lower end to said rod, a hook at the lower end of said rod, and an extension on said rod extending above said filtering portion.

4. For a device of the character described comprising an upper bowl having a hollow stem depending therefrom, a filtering device comprising a filtering portion having an axial opening extending therethrough with an enlarged portion in said opening providing an intermediate shoulder, a helical spring extending downwardly from said shoulder through said opening and having an enlarged portion disposed within the enlarged portion of said opening and seated upon said shoulder for retaining the spring in the filtering portion, a washer fitting within said opening above the spring for retaining said spring in position and preventing the passage of particles, therethrough, a rod extending downwardly through an aperture in said washer and through said spring; the lower end of said spring being secured to said rod, a hook at the bottom of said rod for engaging the bottom edge of said stem for anchoring said spring thereto in extended position and thereby retaining said filtering portion seated within the mouth of said stem, and an extension on said rod above said filtering portion providing a handle for said rod.

LUDWIG REICHOLD.

REFERENCES CITED

The following references are of record in the file of this patent:

UNITED STATES PATENTS

| Number | Name | Date |
|---|---|---|
| 2,067,470 | Anderson | Jan. 12, 1937 |
| 2,269,956 | Renner | Jan. 13, 1942 |
| 2,300,606 | Wolcott | Nov. 3, 1942 |

FOREIGN PATENTS

| Number | Country | Date |
|---|---|---|
| 401,322 | Great Britain | Nov. 7, 1933 |